June 22, 1926.
J. F. ROGERS
1,589,663
PAWL AND RATCHET MECHANISM
Original Filed May 2, 1925
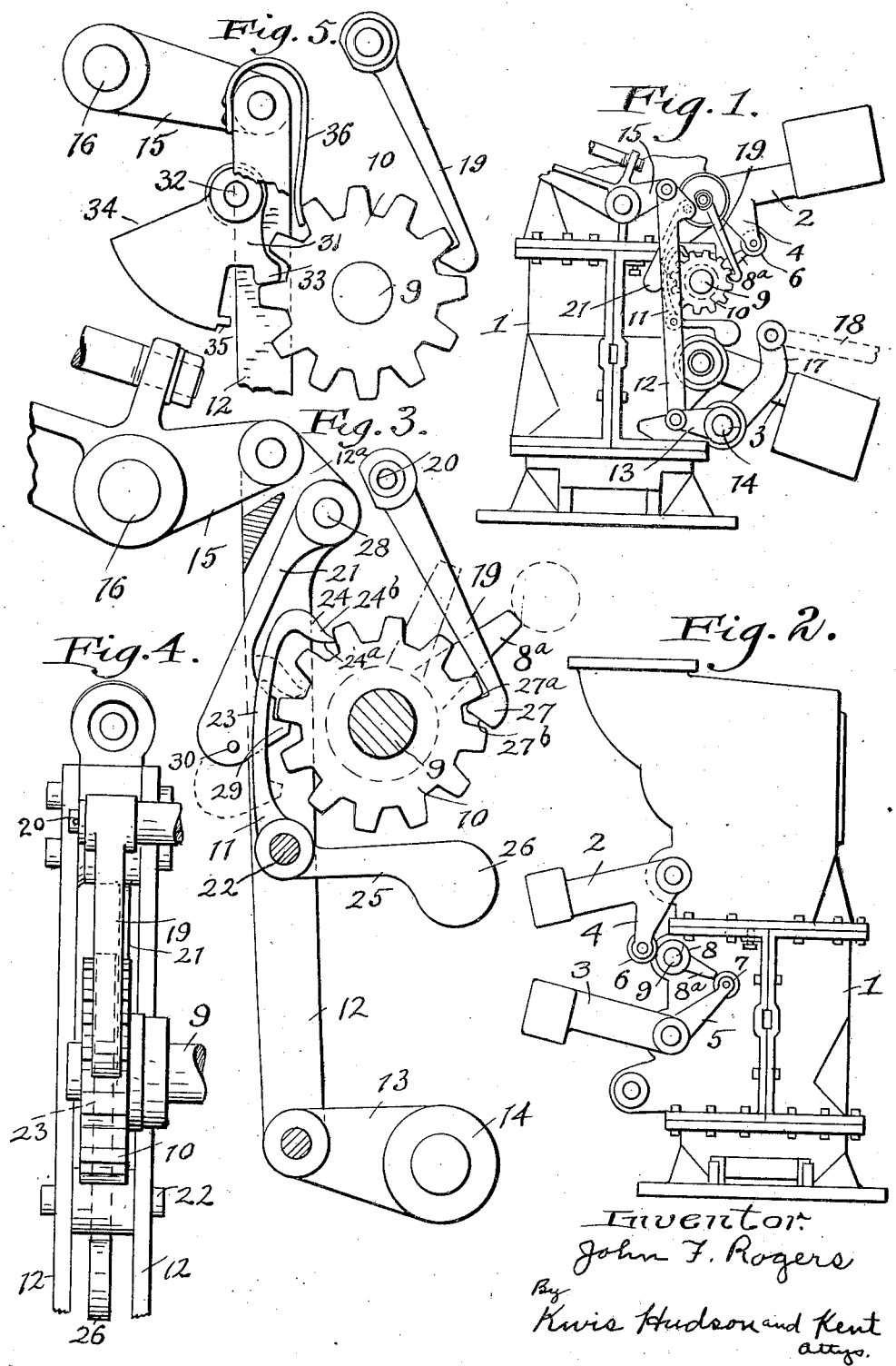
Inventor
John F. Rogers
By Kwis Hudson and Kent
attys.

Patented June 22, 1926.

1,589,663

UNITED STATES PATENT OFFICE.

JOHN F. ROGERS, OF CLEVELAND HEIGHTS, OHIO, ASSIGNOR TO THE WELLMAN-SEAVER-MORGAN COMPANY, OF CLEVELAND, OHIO, A CORPORATION OF OHIO.

PAWL-AND-RATCHET MECHANISM.

Original application filed May 2, 1925, Serial No. 27,379. Divided and this application filed June 24, 1925. Serial No. 39,220.

This invention relates to a pawl and ratchet mechanism and has for its object to provide a simple, compact and rugged mechanism capable of imparting predetermined intermittent movements to a ratchet and of preventing any movement of the ratchet other than that imparted by the actuating pawl.

The present invention is particularly designed for imparting definite predetermined turning movements in one direction to a shaft upon which there may be imposed loads tending at times to turn the shaft in a forward direction and at times to turn the shaft in the reverse direction. As shown herein, the pawl and ratchet mechanism is applied to a cam shaft which intermittently operates the counterweighted valves of a mechanical fuel feeder, the present invention being a division of my co-pending application, Serial No. 27,379, filed May 2, 1925, for mechanical feeder for gas producers.

Reference should be had to the accompanying drawings, forming a part of this specification, in which, Fig. 1 is a fragmentary side elevation of a mechanical fuel feeder showing the present invention applied thereto; Fig. 2 is a side elevation looking toward the side of the fuel feeder opposite that shown in Fig. 1; Fig 3 shows the pawl and ratchet mechanism in side elevation on an enlarged scale; Fig. 4 is a front elevation of the pawl and ratchet mechanism; and Fig. 5 is a fragmentary side elevation showing a modification of the invention.

Referring to the accompanying drawings, the present invention is illustrated as applied to a mechanical fuel feeder, but it is to be understood that the pawl and ratchet mechanism of the present invention is of general application and that its use is not limited to the particular machine herein shown. Figs. 1 and 2 of the drawing, show the casing 1 of a fuel feeder, which has upper and lower valves within the casing 1, which are counterbalanced by counterweighted levers 2 and 3. The upper lever 2 has an integral downwardly and outwardly extending arm 4 and the lower lever 3, has an upwardly and inwardly extending arm 5, the arms 4 and 5 having rollers 6 and 7 which engage with a cam 8 carried by a horizontal shaft 9 journaled upon the wall of the casing 1. The rollers 6 and 7 are arranged to engage the cam 8 upon opposite sides of the shaft 9, the cam 8 being provided with an outwardly projecting arm $8^a$ which, during the rotation of the cam, engages alternately with the rollers 6 and 7 to alternately swing the levers 2 and 3 in a direction to lift the counterweights and open the valves.

The present invention comprises a pawl and ratchet mechanism for actuating the cam shaft 9, which is acted upon by the counterweighted levers 2 and 3, as the rollers 6 and 7 engage the front and rear faces of the cam arm $8^a$, the counterweights acting against one face of the arm to exert a turning force on the shaft in one direction and against the opposite face of the cam arm to exert a turning force in the opposite direction. The pawl and ratchet mechanism serves to impart predetermined movements to the shaft 9 regardless of the direction in which the counterweights tend to move the shaft, means being provided for preventing reverse rotation of the ratchet and for preventing the ratchet from overrunning its actuating pawl. At the end thereof, opposite that carrying the cam 8 and upon the opposite side of the casing 1, a ratchet 10, in the form of a spur gear with involute teeth, is fixed to the shaft 9.

The ratchet 10 is actuated by means of a pawl 11 carried by a vertically disposed link 12 which is connected at its lower end to an arm 13 which is fixed to and extends forwardly from a horizontal rock shaft 14 journaled in bearing brackets fixed to the lower portion of the casing and at its upper end to an arm 15 which extends rearwardly from a stub shaft 16 carried by the upper portion of the casing. The shaft 14 has fixed thereto an actuating arm 17 to which is attached a connecting rod 18 which is intermittently actuated by a crank or eccentric which may be driven by any suitable mechanism.

To impart the necessary vertical movement to the valves and to provide relatively fast opening and closing movements, the cam arm $8^a$ is preferably a long narrow arm which engages each of the counterweight levers only while the cam is turning through a relatively small portion of its revolution. While the front face of the arm 8 engages with a counterweight lever the weighted end of the lever is lifted and, while the engaging roller of the lever is riding down the rear face of the cam, the counterweight acts upon the arm tending to turn the cam shaft in a direction to cause the ratchet 10 to overrun the pawl. In order to accurately time the movements of the bells it is, therefore, highly important that a pawl and ratchet mechanism be provided which will prevent movement of the ratchet in either direction during the return stroke of the pawl carrier and which will prevent overrunning of the ratchet during the active stroke. The pawl and ratchet mechanism is illustrated in Figs. 1 and 4 of the drawings and includes in addition to the actuating pawl 11 and ratchet 10, a holding pawl 19 suspended from a fixed pivot 20 and a second holding pawl 21 carried by the link 12. The pawl 11 is connected to the link 12 by a horizontal pivot 22 and has a curved arm 23 extending upwardly from the pivot 22 and terminating in a ratchet engaging tooth 24. The pawl also has an arm 25 extending out from the pivot 22 and carrying a counterweight 26 on its outer end for rocking the pawl in a direction to engage the tooth 24, with the teeth of the ratchet 10, the tooth 24 has a lower face 24$^a$ formed to positively engage the teeth of the ratchet on the down stroke of the link 12 to turn the ratchet, and an upper face 24$^b$ so formed that when moved upwardly with the link 12, it will engage the ratchet tooth in its path at an inclination such that the thrust on the pawl has an outward component tending to shift the arm 23 in opposition to its counterweight 26 away from the ratchet to permit the tooth 24 to pass a tooth of the ratchet on the up stroke. The holding pawl 19, which is suspended from the pivot 20 directly over the cam shaft 9, tends to move by gravity into ratchet engaging position and has, at its lower end, a ratchet engaging tooth 27 which has an upper face 27$^a$ formed to have a locking engagement with a ratchet tooth engaging therewith to positively lock the ratchet against turning in a direction opposite that in which the ratchet is turned by the pawl 11. The lower face 27$^b$ of the tooth 27 is beveled at an angle such that as the ratchet is actuated by the pawl 11, the pawl 19 is swung outwardly to permit the teeth of the ratchet to pass the tooth 27. The pawl 19 serves to lock the ratchet against reverse rotation during the return movement of the pawl 11.

The second holding pawl 21 is connected, at its upper end, by a pivot 28 to a projecting portion 12$^a$ of the link 12 and has a ratchet engaging tooth 29 at its lower end, the pivot 28 being disposed over the ratchet so that the pawl 11 tends to move by gravity to engaging position. The tooth 29 of the pawl 21 is formed to have a locking engagement with the teeth of the ratchet to prevent movement of a tooth past the same in the direction in which the ratchet is moved by the pawl 11. The pawl 21 moves with the actuating pawl 11 and engages with the ratchet during the active stroke of the pawl 11 to prevent overrunning of the ratchet. The pawl 11 is so mounted on the link 12, that the tooth 24 thereof, at the end of the down stroke, lies substantially at the level of the shaft 9, which carries the ratchet so that during the down stroke the tooth arm 23 swings outwardly from the axis of the ratchet. This movement of the arm 23 is utilized to free the tooth 29 of the pawl 21 at the end of the down stroke, the pawl 21 having a pin 30 with which the arm 23 engages during the downward movement thereof and the pin engaging edge of the arm 23 being so curved that the tooth 29 is moved to a position clear of the ratchet at the end of the down stroke so that the tooth 29 of the pawl will ride over the tooth of the ratchet immediately above it during the return or up stroke of the link 12.

During the down stroke of the link 12, the ratchet is turned by the pawl 11 and held against overrunning by the pawl 21. At the end of the down stroke, the pawl 21 is freed from the ratchet and the tooth 27 of the pawl 19 drops into engagement therewith. The pawl 19 locks the ratchet against rotation in a direction reverse to that imparted thereto by the pawl 11 on the down stroke thereof and takes the thrust imparted by the upper face 24$^b$ of the tooth 63 during the upward stroke, the face 24$^b$ of the tooth 24 exerting a pressure on the ratchet tooth with which it engages and serving to prevent rotation of the shaft 9 in a forward direction during the return stroke of the pawl. As the link 12 approaches its upper limit of movement, the tooth 29 of the pawl 21 drops into ratchet engaging position and the tooth 24 of the pawl 11 rides over the end of the ratchet tooth with which it has been engaging and drops into engagement with the rear face of the tooth. It should be noted that the tooth 24 of the pawl 11 when in engagement with the ratchet, lies to the same side of the pivot 22 of the pawl as the counterweight 26 and the lower engaging face 24$^a$ thereof is so disposed that the thrust against the ratchet tooth during the downward stroke has a component acting in a direction to press the arm 23 toward the ratchet and hold the tooth 24 in engagement with the ratchet.

In Fig. 5 of the drawing there is shown a modified form of pawl and ratchet designed to prevent overrunning and reverse rotation of the cam shaft. In this modification the ratchet 10 and holding pawl 19 are the same as in the modification above described and the ratchet operating means is carried by the same link 12. The actuating pawl 31 is suspended at its upper end by a pivot 32 from the link 12 and has an engaging tooth 33 formed to have a driving engagement with the ratchet teeth during downward movements of the link. The pawl 31 has also a counterweight 34 acting to move the pawl toward engaging position, the counterweight having a lug 35 engageable with the link 12 to limit the movement thereof toward the ratchet.

For preventing overrunning of the ratchet, a leaf spring 36 is fixed at its upper end to the link 12 and has its lower end positioned to engage the teeth of the ratchet during the active stroke of the link 12. The spring 36 yields as the ratchet is turned by the pawl 31 but has sufficient strength to hold the ratchet from overrunning the actuating pawl.

Having thus described my invention, I claim:

1. A ratchet and pawl mechanism comprising a ratchet, an actuating member having an actuating pawl engageable with the teeth of the ratchet to drive the same in one direction, means engageable with the teeth of the ratchet for preventing reverse rotation, and means engageable with the teeth of the ratchet to prevent the same from overrunning the actuating pawl during the driving stroke thereof.

2. A ratchet and pawl mechanism comprising a ratchet, an actuating member having an actuating pawl engageable with the teeth of the ratchet to drive the same in one direction, an independently operable pawl engageable with the teeth of the ratchet to prevent reverse rotation, and means movable with the actuating pawl and engageable with the teeth of the ratchet to prevent the same from overrunning the actuating pawl during the driving stroke thereof.

3. A ratchet and pawl mechanism comprising a ratchet, an actuating member having an actuating pawl engageable with the teeth of the ratchet to drive the same in one direction, an independently operable pawl engageable with the teeth of the ratchet to prevent reverse rotation, said pawls being yieldingly held toward ratchet engaging position and adapted to be moved out of ratchet engaging position by the same faces of the ratchet teeth and to have locking engagement with the opposite faces thereof, and means for preventing the ratchet from overrunning the pawl during the driving stroke thereof.

4. A ratchet and pawl mechanism comprising a ratchet, an actuating member having an actuating pawl engageable with the teeth of the ratchet to drive the same in one direction, an independently operable pawl engageable with the teeth of the ratchet to prevent reverse rotation, said pawls being yieldingly held toward ratchet engaging position and adapted to be moved out of ratchet engaging position by the same faces of the ratchet teeth and to have locking engagement with the opposite faces thereof, and means carried by the actuating member and engageable with the teeth of the ratchet during the driving stroke of the actuating pawl to prevent the same from overrunning the actuating pawl.

5. A ratchet and pawl mechanism comprising a ratchet, a ratchet actuating member having a pawl yieldingly held in ratchet engaging position, said pawl being adapted to turn the ratchet during movements of said member in one direction and to ride over the teeth of the ratchet during return movements, an independent holding pawl, and means engaging the teeth of the ratchet during the driving stroke of the actuating member to prevent the same from overrunning the actuating pawl.

6. A ratchet and pawl mechanism comprising a ratchet, a ratchet actuating member having an actuating pawl and an oppositely acting holding pawl both having a bias toward ratchet engaging position, the actuating pawl having driving engagement with teeth of the ratchet during movements of the actuating member in one direction and riding over the teeth during reverse movements, the holding pawl engaging the ratchet teeth during the driving stroke of the actuating member to prevent the ratchet from overrunning the actuating pawl, and an independently mounted holding pawl engaging the teeth of the ratchet to prevent reverse rotation of the ratchet during return movements of the actuating pawl.

7. A ratchet and pawl mechanism comprising a ratchet, an actuating member having an actuating pawl engageable with the teeth of the ratchet to drive the same in one direction, an independently operable pawl engageable with the teeth of the ratchet to prevent reverse rotation, said pawls being yieldingly held toward ratchet engaging position and adapted to be moved out of ratchet engaging position by the same faces of the ratchet teeth and to have locking engagement with the opposite faces thereof, and means carried by the actuating member and engageable with the teeth of the ratchet to prevent the same from overrunning the actuating pawl, said actuating pawl being formed to exert a thrust upon the teeth of the ratchet during the return stroke to prevent forward rotation of the ratchet.

8. A ratchet and pawl mechanism comprising a ratchet having gear teeth, a reciprocable actuating member having a gravity actuated actuating pawl adapted to have driving engagement with the teeth of the ratchet during movements of the actuating member in one direction and to be forced out of engaging position by the teeth of the ratchet during movements of the actuating member in the opposite direction, means carried by the actuating member and engaging with the teeth of the ratchet to prevent the ratchet from overrunning the actuating pawl, and a gravity actuated independently mounted holding pawl adapted to ride over the teeth of the ratchet during the actuation thereof by the actuating pawl and to lock the ratchet against rotation in a reverse direction.

9. A ratchet and pawl mechanism comprising a ratchet, a reciprocable actuating member, and two oppositely acting pawls carried by said actuating member, both said pawls being movable by gravity toward ratchet engaging position, one of said pawls being an actuating pawl adapted to have driving engagement with the teeth of the ratchet during movements of the actuating member in one direction, the other of the pawls being engageable with teeth of the ratchet to prevent the same from overrunning the actuating pawl during actuation, said pawls having parts inter-engaging to release the holding pawl upon completion of the active stroke of the actuating member.

10. A ratchet and pawl mechanism comprising a ratchet, a reciprocable actuating member, two oppositely acting pawls carried by said actuating member, both said pawls being movable by gravity toward ratchet engaging position, one of said pawls being an actuating pawl adapted to have driving engagement with the teeth of the ratchet during movements of the actuating member in one direction, the other of the pawls being engageable with teeth of the ratchet to prevent the same from overrunning the actuating pawl during actuation, said pawls having parts inter-engaging to release the holding pawl upon completion of the active stroke of the actuating member, and a separate holding pawl engageable with the ratchet during the return stroke of the actuating member.

11. A ratchet and pawl mechanism comprising a ratchet having gear teeth and mounted to turn on a horizontal axis, a vertically disposed reciprocable actuating member, an actuating pawl pivoted to said actuating member to swing about a horizontal axis, said pawl having an upwardly extending arm with a ratchet engaging tooth and a laterally extending counterweight arm, a holding pawl pivoted above said actuating pawl to swing about a horizontal axis and tending to move by gravity into ratchet engaging position, said holding pawl having a part in the path of movement of said upwardly extending arm of the actuating pawl whereby the actuating pawl in its movements may release the holding pawl.

In testimony whereof, I hereunto affix my signature.

JOHN F. ROGERS.